United States Patent [19]
Gupta et al.

[11] Patent Number: 5,633,954
[45] Date of Patent: May 27, 1997

[54] SYSTEM AND METHOD FOR CHARACTER RECOGNITION WITH NORMALIZATION

[75] Inventors: Amar Gupta, Cambridge; Maram V. Nagendraprasad, Amherst; Patrick S. P. Wang, Lexington, all of Mass.

[73] Assignee: Massachusetts Institute of Technology, Cambridge, Mass.

[21] Appl. No.: 316,718

[22] Filed: Sep. 30, 1994

Related U.S. Application Data

[63] Continuation of Ser. No. 63,251, May 18, 1993, abandoned.
[51] Int. Cl.$^6$ ..................................................... G06K 9/00
[52] U.S. Cl. ................................... 382/187; 382/258
[58] Field of Search ............................. 382/181, 187, 382/276, 296, 289, 298, 290, 302, 258, 259, 155, 156

[56] References Cited

U.S. PATENT DOCUMENTS

| | | | |
|---|---|---|---|
| 4,010,446 | 3/1977 | Kawa | 382/55 |
| 4,155,072 | 5/1979 | Kawa | 340/146.3 H |
| 4,162,482 | 7/1979 | Su | 382/55 |
| 4,479,241 | 10/1984 | Buckley | 382/15 |

(List continued on next page.)

OTHER PUBLICATIONS

"A Character Segmentation Algorithm for Mixed-Mode Communication", Nakamura et al., *Systems and Computers in Japan*, vol. 16, No. 4, Jul. 1985, pp. 66-75.

"An Algorithm for Segmenting Handwritten Numeral Strings", Sparks et al., *ICARV '92 2nd Int. Conf. on Automation, Robotics, and Computer Vision*, vol. 1, Sep. 16, 1992, pp. 1.1.1-1.1.4.

"Recognition of Handprinted Characters by Nonlinear Elastic Matching", Fujimoto et al., *Proc. of the Int. Joint Conf. on Pattern Recognition*, Nov. 8, 1976, pp. 113-118.

International Search Report for International Application No. PCT/US94/05246, seven pages.

"An Improved Structural Approach for Automated Recognition of Handprinted Characters", Wang and Gupta, *International Journal of Pattern Recognition and Artificial Intelligence*, vol. 5, No. 1 & 2, pp. 97-121, 1991.

"A Neural Net Based 'Hybrid' Approach to Handwritten Numeral Recognition", Wang, Nagendraprasad, and Gupta, *From Pixels to Features III: Frontiers in Handwriting Recognition*, pp. 145-154, Oct./Sep. 1991.

"A Fast and Flexible Thinning Algorithm", Wang and Zhang, *IEEE Transactions on Computers*, vol. 38, No. 5, pp. 741-745, May 1989.

"A Comment on 'A Fast Parallel Algorithm for Thinning Digital Patterns'", Lü and Wang, *Communications of the acm*, vol. 29, No. 3, pp. 239-242, Mar. 1986.

"An Experimental Study of Machine Recognition of Hand-Printed Numeral", Bakis, Herbst, and Nagy, vol. SSC-4, No. 2, pp. 119-132, Jul. 1968.

*Primary Examiner*—Joseph Mancuso
*Assistant Examiner*—Gerard Del Rosso
*Attorney, Agent, or Firm*—Testa, Hurwitz & Thibeault, LLP

[57] ABSTRACT

A character recognition system comprises means for receiving a first binary image of a plurality of characters; segmenting means for separating the first binary image into a plurality of second binary images corresponding to the plurality of characters in the first binary image; normalizing means for reducing variations among the characters, which normalizing means comprises stroke adjusting means for processing the second binary images to adjust strokes of the characters to a predetermined thickness, size normalization means for processing the second binary images to proportionally adjust the overall size of the characters to a predetermined overall size, and slant correction means for processing the second binary images to reduce a slant with respect to a predetermined axis of the characters; and recognizer means coupled to the normalizing means for processing the normalized second binary images to determine which character is represented by each of the normalized second binary images.

11 Claims, 9 Drawing Sheets

U.S. PATENT DOCUMENTS

| | | | |
|---|---|---|---|
| 4,521,909 | 6/1985 | Wang | 382/38 |
| 4,837,842 | 6/1989 | Holt | 382/26 |
| 4,845,768 | 7/1989 | Kochert et al. | 382/46 |
| 4,876,731 | 10/1989 | Loris et al. | 382/40 |
| 5,052,043 | 9/1991 | Gaborski | 382/14 |
| 5,058,180 | 10/1991 | Khan | 382/14 |
| 5,058,184 | 10/1991 | Fukushima | 382/37 |
| 5,097,517 | 3/1992 | Holt | 382/7 |
| 5,101,437 | 3/1992 | Plamondon | 382/3 |
| 5,134,669 | 7/1992 | Keogh et al. | 382/61 |
| 5,151,951 | 9/1992 | Ueda et al. | 385/19 |
| 5,163,111 | 11/1992 | Baji et al. | 395/22 |
| 5,243,668 | 9/1993 | Kitamura et al. | 382/50 |
| 5,299,269 | 3/1994 | Gaborski et al. | 382/14 |

```
0000000000000000011000000000000000000000011000000000000000000000000
0000000000000001100000000000010000000001100000000000000000011100
00000000010000110000000111111110000000110000011100000001111111100
000000011100110000001111111000110001100000111110000011111111000
00000000110001000000111000000001100001100001110110000111001100000
000000011000110000011100000000111000110001110001000111000110000000
0000001100011000001110000000011000110001110011001110001100000
000011100011110011111000000110001110011000110011100011000000
00011111111111100000000110011111111110110001100000000110000000
0011111111000000000001100111111100001100011000000001110000000
001110011100000100000110000000110000011111100000000111000000000
000000011000000011000111000000011100000111100000000111000000000
000000110000000011111100000001110000001100000000001110000000000
0000011000000000001100000000011100000000000000000001100000000000
000011100000000000000000000011000000000000000000011100000000000
0000110000000000000000000000000000000000000000000011000000000000
```

| p[7] : [i-1, j-1] | p[0] : [i-1, j] | p[1] : [i-1, j+1] |
|---|---|---|
| p[6] : [i, j-1] | p : [i, j] | p[2] : [i, j+1] |
| p[5] : [i+1, j-1] | p[4] : [i+1, j] | p[3] : [i+1, j+1] |
FIG. 12
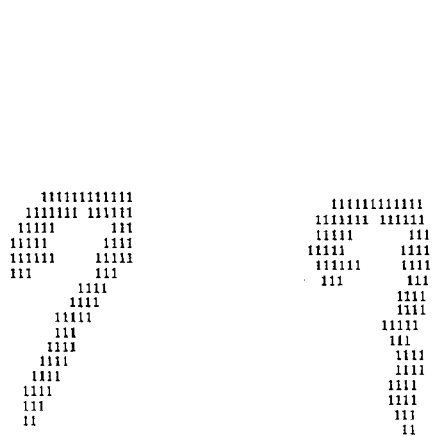
FIG. 13A   FIG. 13B
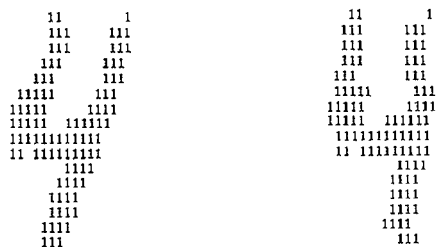
FIG. 13C   FIG. 13D

```
1110000000000000
1111000000000000
0111000000000000
0011100000000000
0011100000000000
0001110000000000
0001111000000000
0000111000000000
0000111000111000
0000111101111110
0000011111111111
0000011111100111
0000000011110111
0000000001111111
0000000000111111
0000000000000111
```

```
0000000011100000
0000001111000000
0000001110000000
0000001110000000
0000011100000000
0000011100000000
0000111100000000
0000111000000000
0001110001110000
0011110111111000
0011111111111000
0011111001110000
0001111011100000
0001111111000000
0001111110000000
0000011100000000
```

```
0000000000000000
0001111111111100
0011111111111100
0011000000011000
0011000000011000
0000000000011000
0000000000011000
0000000000011000
0000000000011000
0000000000111000
0000000000111000
0000000000110000
0000000000110000
0000000000110000
0000000000000000
0000000000000000
```

```
0.000000 ------- [0] : 0.000760
0.000000 ------- [1] : 0.000278
0.000000 ------- [2] : 0.002643
0.000000 ------- [3] : 0.000010
0.000000 ------- [4] : 0.000157
0.000000 ------- [5] : 0.004660
0.000000 ------- [6] : 0.000010
1.000000 ------- [7] : 0.959567
0.000000 ------- [8] : 0.000010
0.000000 ------- [9] : 0.000010
```

SYSTEM AND METHOD FOR CHARACTER RECOGNITION WITH NORMALIZATION

This is a continuation of U.S. patent application Ser. No. 08/063,251 filed on May 18, 1993, now abandoned.

BACKGROUND OF THE INVENTION

This invention relates to automated reading systems and methods, and more particularly, to pattern and character recognition systems and methods including neural network-based character recognition systems and methods.

Computer technology has been used in a wide variety of situations, including business and commercial environments, to improve such areas as productivity, cost-effectiveness, quality, competitiveness, and customer service. Many companies have reduced or eliminated worker involvement in one or more operational aspects of the business by automating a portion or all of an operation.

A computer technology sub-field which has the potential to be useful in a plurality of settings is automated recognition of textual information. The field has been referred to generally as optical character recognition or OCR. In general, an OCR machine "reads" typewritten and/or handwritten characters and tries to determine which character from a fixed set of characters each of the typewritten and/or handwritten characters is intended to represent. Typically, the reading involves scanning a document on which the typewritten and/or handwritten characters appear and generating a binary or pixel (e.g., "black/white") image of the document, or selected sections of the document. The image typically is stored in computer memory and manipulated by data processing techniques to produce another binary image which is selected from a fixed set of binary images, each being representative of one of the characters of the fixed set of characters.

As used herein, a pixel is defined as an image information cell having either the binary state "on" or "off" (e.g., black or white, or 1 or 0).

After the typewritten and/or handwritten characters have been "recognized", the binary images of the recognized characters can be stored in computer memory (or on any kind of information storage device) and/or processed by data processing equipment just as any other binary data can be processed. The recognized characters also could be displayed on a computer display device to provide a user with a visual pixel image of the typewritten and/or handwritten characters read and recognized by the OCR machine.

While the recognition of typewritten characters is a difficult problem, the recognition of handwritten characters presents an even greater challenge. The reason for the complexity is that, in general, every person's handwriting is different.

Many industries such as the banking and financial industries would benefit from a handwriting recognition system capable of recognizing handwritten characters on documents including financial instruments such as checks. Banks, financial institutions, and other handlers of financial instruments such as checks typically use automated equipment somewhere in the check handling process, however human operators sitting at keyboard entry devices are employed to read and enter the "courtesy amount" into a computer system. For example, an automatic check feeder can be used to continually move checks from a storage location to a position in front of the human operator to allow the operator to enter manually the courtesy amounts of the checks into the computer system via the keyboard entry device. (The courtesy amount on a check is the amount of the check, as written by the drawer of the check in Arabic numerals in a small box on the face of the check.)

A character recognition system which can read and recognize a variety of characters, including handwritten characters such as handwritten numerals, on documents without substantial human intervention is desired.

SUMMARY OF THE INVENTION

The invention relates to a character recognition system for receiving a binary image of one or more characters (e.g., handwritten numerals), performing a number of pre-processing operations on the binary image, and then passing the binary image to a recognizer, such as a neural network-based recognizer, for determination of which characters the binary image represents.

The combination of elements that comprise the system result in very accurate determinations, especially when the characters include handwritten Arabic numerals.

The system can be used to recognize the courtesy amount on checks, thereby eliminating the need for human operators to enter the courtesy amount manually into a computer system via a computer terminal. The reduction or elimination of human involvement typically translates into improved productivity, cost-effectiveness, quality, accuracy, competitiveness, and customer satisfaction.

In general, in one aspect, the invention features a character recognition system. The system comprises means for receiving a first binary image of a plurality of characters, segmenting means for separating the first binary image into a plurality of second binary images corresponding to the plurality of characters in the first binary image, normalizing means for reducing variations among the characters, and recognizer means coupled to the normalizing means for processing the normalized second binary images to determine which character is represented by each of the normalized second binary images. The normalizing means comprises stroke adjusting means for processing the second binary images to adjust strokes of the characters to a predetermined thickness, size normalization means for processing the second binary images to proportionally adjust the overall size of the characters to a predetermined overall size, and slant correction means for processing the second binary images to reduce a slant with respect to a predetermined axis of the characters.

Other aspects, features, and advantages of the invention will become apparent from the following description and from the claims.

BRIEF DESCRIPTION OF THE DRAWINGS

FIG. 12 is a diagram of a pixel of an image and its neighboring pixels.

FIGS. 13A, 13B, 13C, and 13D show two examples of a character before and after slant correction.

DETAILED DESCRIPTION

Figure 1:
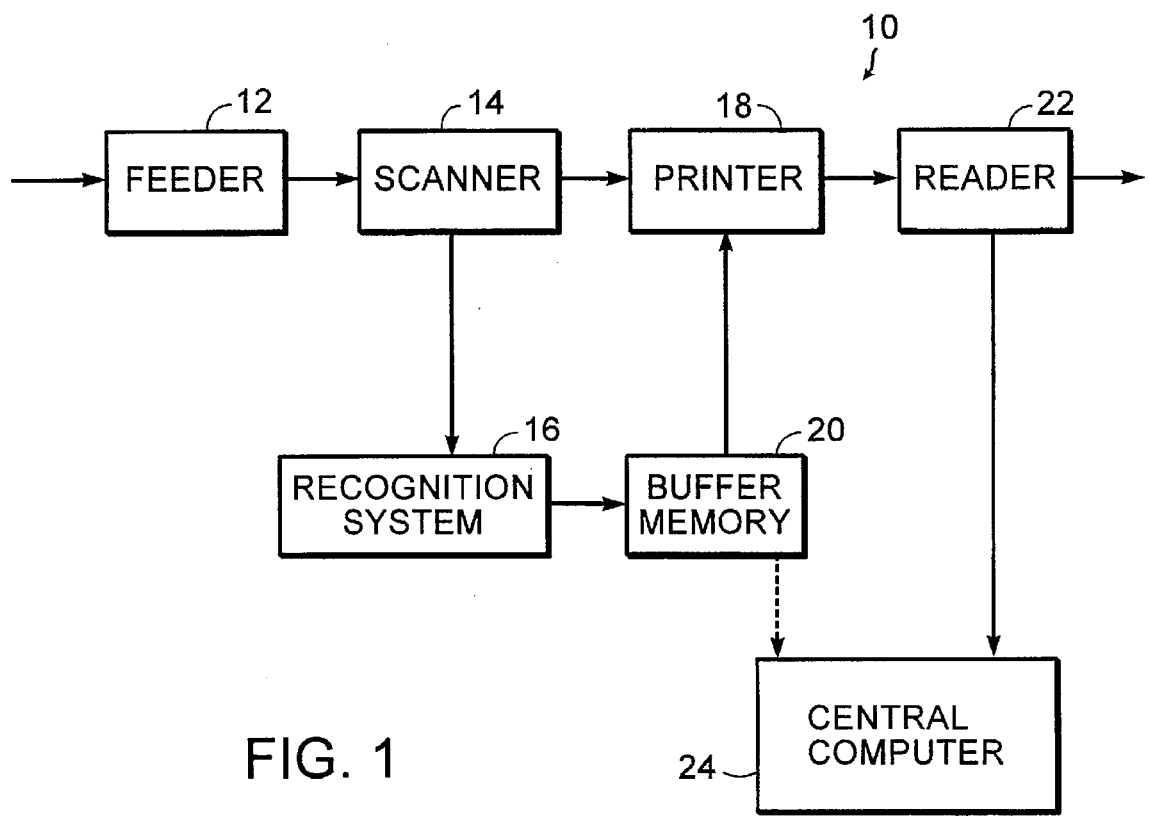
FIG. 1 is a block diagram of a bank check processing system including a recognition system according to the invention.
Figure 2:
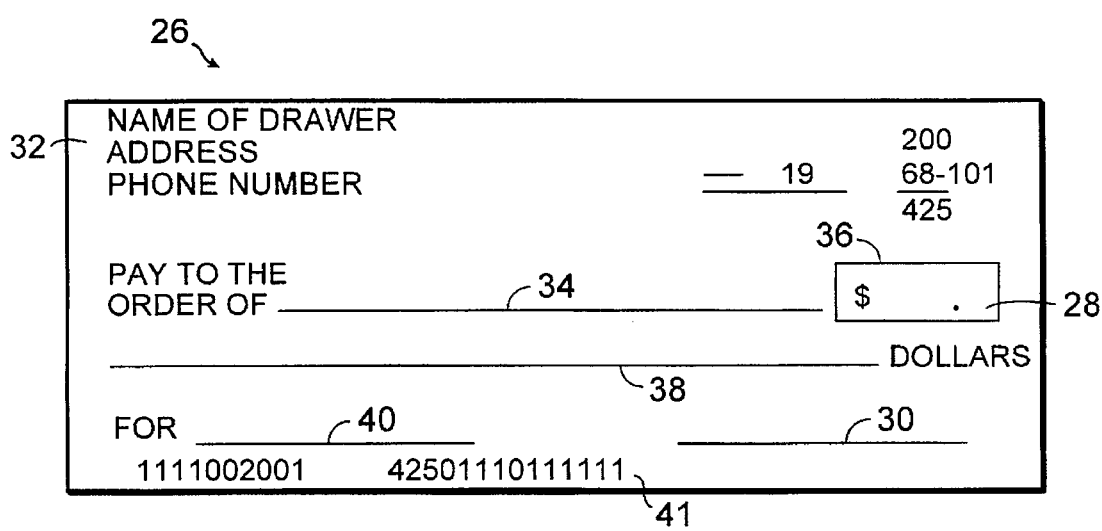
FIG. 2 is a plan view of a typical bank check which can be processed by the system of FIG. 1.

Referring to FIGS. 1 and 2, one embodiment of a system 10 to be used by banks, financial institutions, and other handlers of financial instruments to process financial instruments, especially bank checks 26, includes an automatic document feeder 12 which physically moves the checks from a storage location (not shown) to a digital scanner 14. For each check, the scanner 14 generates a binary or pixel image pattern of the check or a selected portion of the check such as the area of the check in which a courtesy amount 28 is written. The scanner 14 then supplies the binary image to a recognition system 16 according to the invention. After being scanned, the check itself is passed by the scanner 14 to a printer 18.

The recognition system 16, as described below, can include a neural network-based recognizer and can process the binary image received from the scanner 14 to determine all of the characters written on the check or in the selected portion of the check which was scanned. In general, the recognition system 16 generates data representative of each character on the check (or in the selected portion of the check) and passes that data as output to a buffer memory 20 or similar device. When the recognition system 16 is provided with a binary image of the courtesy amount 28 which is, for example, handwritten on the check by a drawer of the check 26, the recognition system 16 processes the binary image and generates data representative of the courtesy amount 28.

In the disclosed embodiment of the system 10, the buffer memory 20 provides the data generated by the recognition system 16 to the printer 18 which prints the courtesy amount in machine readable form, typically using magnetic ink, somewhere on the check 26 such as below the drawer's signature line 30 of the check 26. The printer 18 then passes the check to a reader 22 which reads all of the machine readable printing on the check including pre-printed information identifying the checking account number and the bank where the checking account is maintained as well as the courtesy amount recently printed on the check by the printer 18. The reader 22 generates data representative of all of the machine readable printing located on the check and provides that data to a central computer 24 of the bank, financial institution or other handler of the checks. The central computer 24 also can receive the data representative of the courtesy amount from the buffer memory 20, as indicated by the dotted line.

The central computer 24 typically controls and/or initiates other aspects of the bank's operations such as sorting checks by customer account and generating periodic statements for customer accounts.

Note that the recognition system 16 can be used in different configurations and settings from that shown in FIG. 1, as will be appreciated by those of ordinary skill in the art. For example, in some configurations, the printer 18 can be eliminated, and/or one or both of the recognition system 16 and the buffer memory 20 can be part of the central computer 24 (i.e., the central computer performs, generally in addition to its other functions, all of the functions of the recognition system and/or the buffer memory).

The face of a typical blank check which can be processed by the system 10 after the check is completed by a drawer includes a variety of pre-printed information. For example, the name, address, and telephone number of the drawer can be pre-printed in the upper left-hand corner 32. A payee's name can be entered by the drawer on a line 34 preceded by "PAY TO THE ORDER OF." A box 36 typically surrounds the courtesy amount 28. Below the payee line 34 is a line 38 on which the amount of the check, represented by Arabic numerals in the box 36, is written out in words by the drawer of the check 26. To the left of the drawer's signature line 30 is line 40 for entering a comment. The comment line 40 is preceded by "FOR." Across the bottom of the face of the blank check, a series of characters 41 (typically all numerals) is pre-printed in machine readable form such as with magnetic ink. Typically, this series of characters 41 identifies the drawer's account number and the bank on which the check is drawn. Other information also can be encoded in the series of characters 41. Note that the series of characters 41 typically is the only pre-printed information on the blank check 26 which is machine readable (e.g., which is printed with magnetic ink).

Figure 3A:
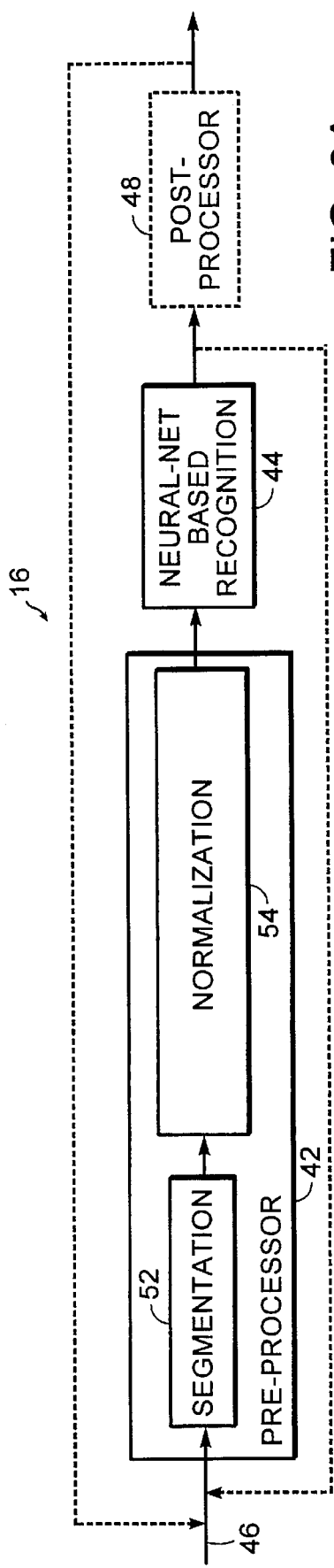
FIG. 3A is a block diagram of a character recognition system according to the invention.
Figure 3B:
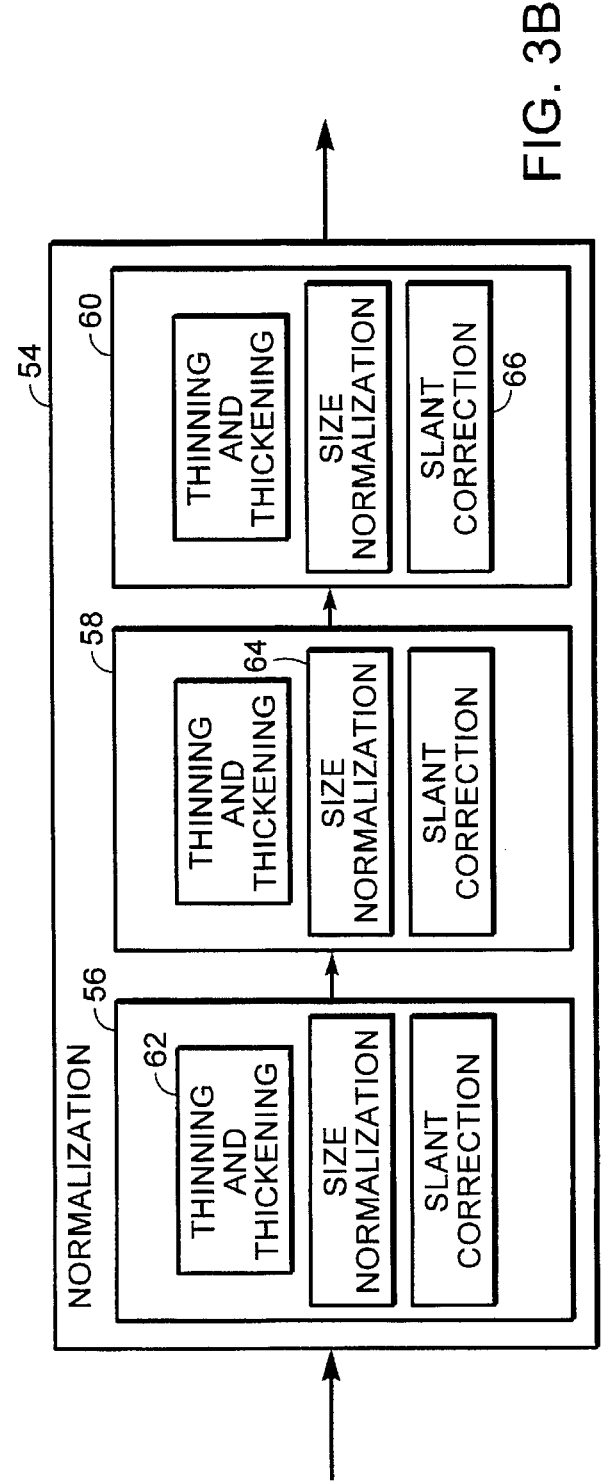
FIG. 3B is an expanded block diagram of a normalization portion of the system of FIG. 3A.

Referring to FIGS. 3A and 3B, the recognition system 16 according to the invention includes a pre-processor 42 followed by a recognizer 44. The pre-processor 42 is an image processor which receives binary images as an input 46 (e.g., from the scanner 14 of FIG. 1) and processes each of the binary images to reduce variations in each of the images thereby enhancing the accuracy of the recognizer 44.

A post-processor 48 can be added to further enhance the overall accuracy of the recognition system 16. As indicated by the dotted lines, feedback can be used, either from the output of the recognizer 44 to the input 46 or from the output of the post-processor 48 to the input 46.

Figures 4, 5:
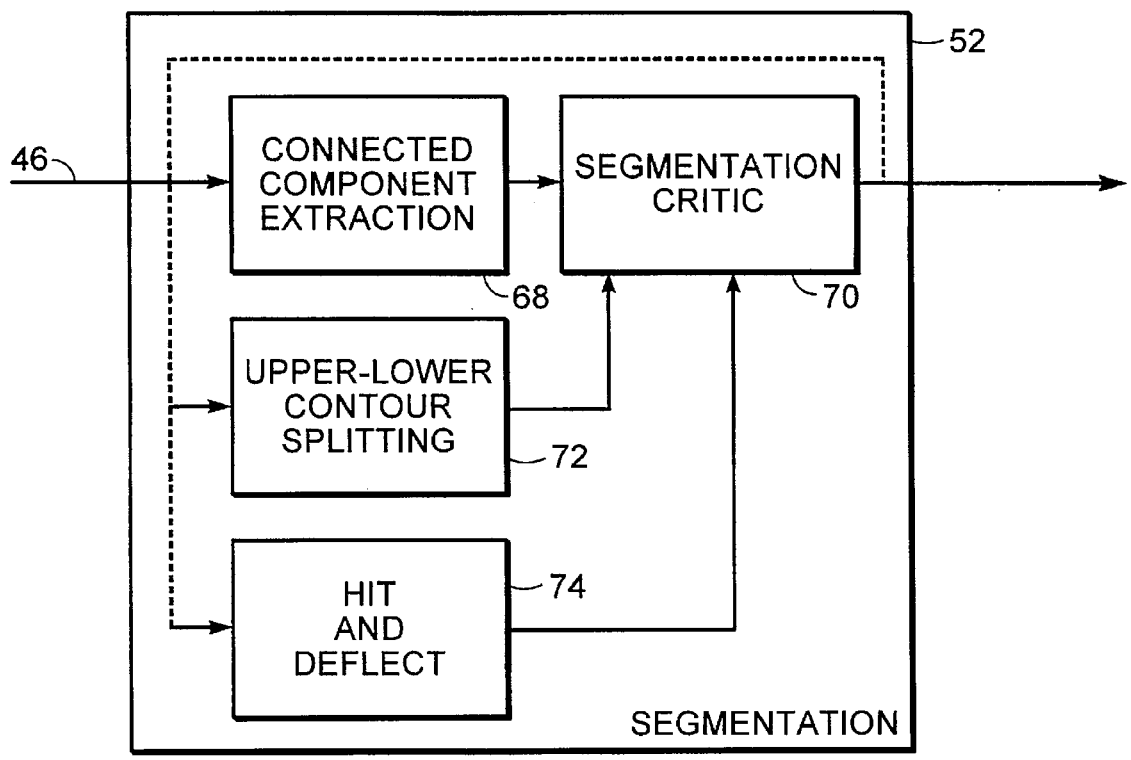
FIG. 4 is a bitmap array which can be used as an input to the recognition system of FIG. 3A.
FIG. 5 is an expanded block diagram of a segmentation portion of the system of FIG. 3A.

In one embodiment, each of the binary images provided to the pre-processor 42 as an input is a binary image pattern of the courtesy amount 28 (FIG. 2) handwritten (generally non-cursively) on the face of a check. As shown in FIG. 4, the input to the pre-processor 42 can be in the form of a binary bitmap array 50. The array 50 is the bitmap for the handwritten amount "45407." While this description will hereinafter only concern inputs in the binary bitmap array format, those of ordinary skill in the art will recognize that many other types of data arrangements are possible.

A detailed description of the pre-processor 42, the recognizer 44, and the post-processor 48 follows.

Pre-processor

The pre-processor 42 of FIG. 3A includes a segmenter 52 and a normalizer 54. The segmenter 52 separates the bitmap array input into a plurality of smaller bitmaps. As shown in FIG. 3B, the normalizer 54 includes three sub-modules 56, 58, and 60. Each of the three sub-modules performs one of three possible functions on each of the smaller bitmaps, and the function which each sub-module performs is distinct from the other two sub-modules. The three possible functions are (1) thinning and thickening, (2) size normalization, and (3) slant correction. In one embodiment, a thinning and thickening module 62 precedes a size normalization module 64 which in turn precedes a slant correction module 66. Other embodiments can include any of the other five possible combinations of the three sub-modules of the normalizer 54.

The segmenter 52 processes the bitmap array input to distinguish each character from its neighboring characters. The segmenter 52 does not itself necessarily recognize the identity of each of the characters. Instead, the segmenter 52 separates or decomposes a string of characters (represented by the input bitmap array) into a plurality of bitmap arrays, each of which represents one of the individual characters in the input string of characters. For example, if the input was "454.17" (e.g., see FIG. 4), the segmenter 52 ideally produces five separate bitmap arrays as an output (delimiters such as the period typically are discarded, as described below). These five separate bitmaps are: one of the first-occurring "4", another of "5", another of the second-occurring "4", another of "1", and another of "7".

The segmenter 52 employs a "multi-stage" strategy which allows it to handle a wide variety of inputs (e.g., handwritten courtesy amounts in which one or more characters touch another character and slant variations exist amongst the characters) and to achieve high accuracy in a short period of processing time.

The segmenter 52 operates on an input without any a priori knowledge of the number of characters in the input string. In general, the segmenter 52 can handle an input string having any number of characters, i.e., an input of arbitrary length. It generally also can handle such an input string if the characters are connected or overlapping, if each of the characters is slanted at an angle or direction different from each of the other characters in the input string, and if the relative overall size of each of the characters in the input string differs (e.g., numerals in a dollar component of a courtesy amount on a check typically are larger than numerals in a cents component of the courtesy amount). In short, the segmenter 52 can process "unconstrained" inputs.

Referring to FIG. 5, the multi-stage strategy of the segmenter 52 generally includes three stages. In a first stage, the input bitmap array is passed to an extraction module 68 whose output is "critiqued" by a segmentation critic 70. If the critic 70 is not satisfied with the results of the extraction module 68, the critic 70 passes the output of the extraction module 68 to a second stage. In the second stage, a contour splitting module 72 processes the output of the critic 70 and passes the result to the critic 70 for its approval. If the critic is not satisfied with the output of the module 72, the critic 70 passes the output of the module 72 to a third stage. In the third stage, a hit and deflect module 74 processes the output of the critic 70 and supplies the result to the critic 70 which critiques the result and forwards data to the normalizer 54 of FIG. 3A. If, at any stage, the critic 70 is satisfied, it forwards data to the normalizer 54 and bypasses the stages yet to be performed.

In general, the segmentation critic 70 is a knowledge-based decision maker. Antecedents for its decision rules are either simple structural features of the input bitmaps or an aggregation of such simple structural features. Application of the rules leads to decisions like "pass to next stage". Some of the rules are based on a threshold for an aspect ratio of bitmaps (e.g., to identify and discard delimiters such as periods and commas). Other rules employ heuristics based on relative weights and heights of segmented pieces and the nature of cuts for checking the validity of outputs produced by each of the three stages. The operation of the critic 70 is described in more detail below, with relation to the three modules 68, 72, and 74.

In the first stage, the extraction module 68 (which assumes the input bitmap array includes values of "1" and/or "0") performs a bit-wise scan of the input bitmap array to identify and extract-out the connected components (i.e., connected character strokes) in the input bitmap. The extraction can be accomplished by a tree-traversal algorithm. Tree-traversal algorithms are well-known to those of ordinary skill in the art. A process which can be used by the module 68 to extract connected components is given below. This extraction process uses two data structures: a queue and a stack.

(1) make__null__stack (2) add__to__queue (any pixel y with v(y)=1), then mark y "done"(its corresponding equivalence class will be extracted during this iteration)

(3) x=front__of__queue (4) remove front of queue and push it into the stack (5) add each element of $1\_N(x)$ to the queue if not marked "done" then mark it "done"

(6) if not__empty__queue then goto (3)

When the extraction process stops, the elements in the stack provide all the coordinates of the pixels belonging to a particular connected component. If these pixels are set to zero and another run is performed on the input array, another connected component is extracted. While the process only deals with pairs of connected characters, those of ordinary skill in the art will realize that it can be extended to situations involving more than two connections.

The following definitions are useful in understanding the extraction process outlined above. If $x=(u,v)$ is a pixel, the neighborhood of x is called $N(x)$ and the $v(x)=1$ or 0. The subset of coordinates in the neighborhood which have the value i are defined by $i\_N(x)=\{z/\forall z \epsilon N(x)(v(z)=i), i \{0,1\}\}$. Two elements x and y of a bitmap are connected if a string of coordinates $x=s_1,s_2,s_3, \ldots, s_k=y$ exists where $v(x)=1$ and $\forall 1<j \leq k, s_j \epsilon 1\_N(s_{j-1})$.

The output of the extraction module 68 is passed to the segmentation critic 70 which checks an aspect ratio (i.e., a ratio of height to width) of the "character" represented by each bitmap array output by the module 68. If the character exceeds a predetermined minimum acceptable aspect ratio, the critic 70 assumes the character is actually two or more characters connected together and sends the bitmap array to the second stage (i.e., the contour splitting module 72), otherwise the bitmap array is passed on to the normalizer 54 of FIG. 3A. Also, the critic 70 uses the aspect ratio to identify and discard "small" characters including delimiters such as periods and commas.

Figure 6A:
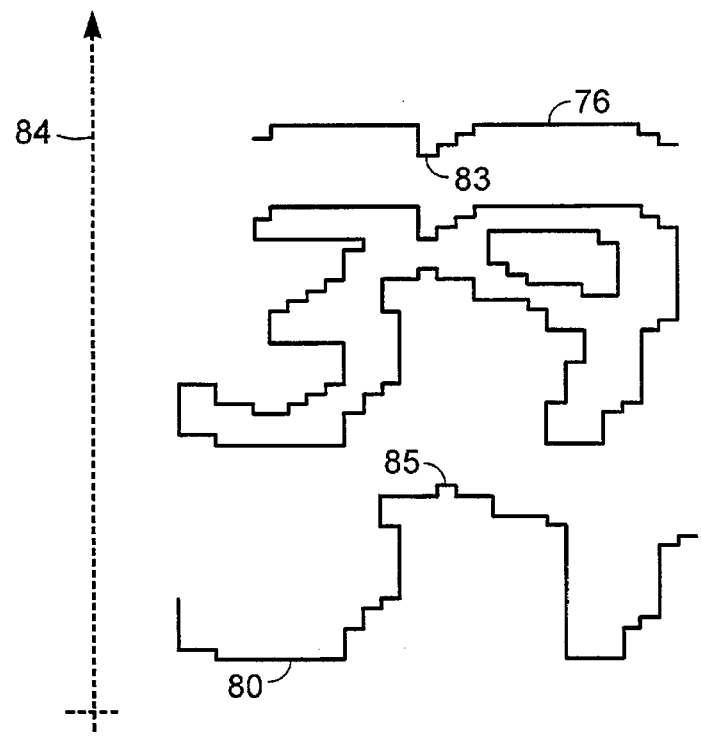
FIGS. 6A and 6B are typical contours generated by the segmentation portion FIG. 5.
Figure 6B:
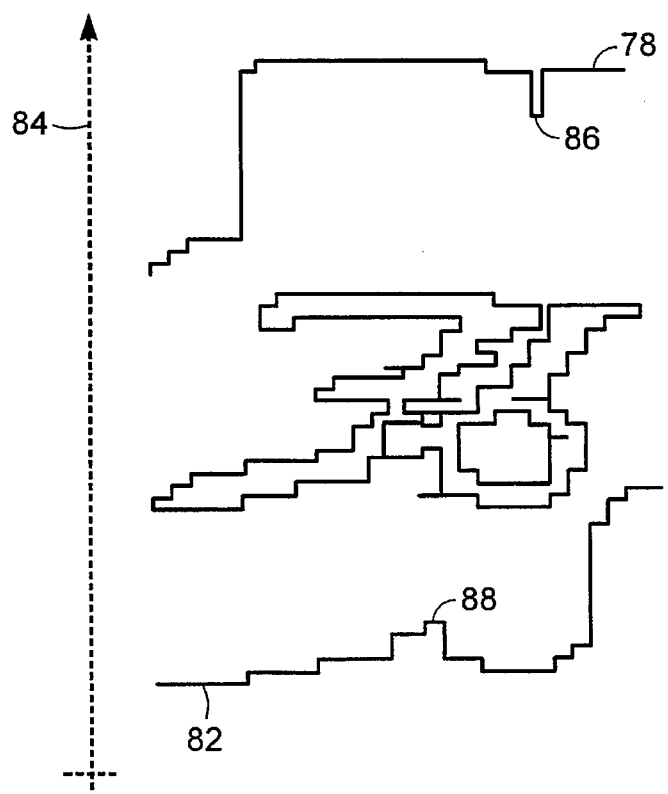

In the second stage, the contour splitter 72 identifies the upper and lower (or top and bottom) contours or profiles of the connected character represented by the bitmap array sent by the critic 70. Certain "signatures" (e.g., minimum and maximum points) on these contours are used to locate the most likely coordinates where the connected character can be split to obtain each of the individual characters. FIGS. 6A and 6B show examples of typical upper 76, 78 and lower 80, 82 contours for pairs of touching or connected characters. The connected character in FIG. 6A includes the individual characters "3" and "9", and it includes "3" and "6" (both slanted to the right) in FIG. 6B.

After generating the full upper and lower contours, the contour splitter 72 scans the contours to find a minimum point 83, 86 (relative to a vertical axis 84) of the upper contour and a maximum point 85, 88 (relative to the axis 84) of the lower contour. Note that in order to locate the minimum and maximum points the scan concentrates on the center of the connected characters and does not extend over the full horizontal length of the connected pair. The scan is performed in this manner by the contour splitter 72 because joints between connected characters usually occur near the center of the connected characters and because contour minima and maxima located to the far left and right of the center are not likely to bear any relation to the connection of the two characters. The minimum and maximum points identified by the contour splitter 72 thus are relative, not absolute, minimum and maximum points.

Figure 7:
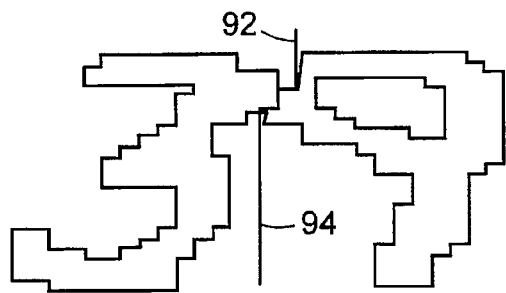
FIG. 7 shows a path drawn between the connected character of FIG. 6A to separate the connected character into two individual characters.

Using the minimum and maximum points, the contour splitter 72 creates a path 90 between the two points as indicated in FIG. 7. The path 90 is created by drawing a vertical line 92 down from the minimum of the upper contour until an edge of the connected character is encountered (i.e., until a "1" bit is encountered), and by drawing another vertical line 94 up from the maximum of the lower contour until a "1" bit is struck.

The contour splitter 72 passes a bitmap array of the connected characters, including the minimum point, the maximum point, and the path data, to the segmentation critic 70 which checks for conditions such as (i) whether the maximum point is less than or equal to the minimum point, (ii) whether the path is horizontal or sloped upwards as viewed from the maximum point, (iii) whether the path crosses two contours or less, and (iv) whether each of the individual characters which result from the path satisfy relative height and weight requirements for detecting character fragments (weight refers to the total number of pixels in each individual character), such as whether each of the individual characters are at least one-half the height of the other individual character and at least one-fifth the weight of the entire connected character.

Condition (ii) captures the fact that most connections between numerals are horizontal connections which need to be split vertically. Vertical connections which need to be split horizontally are rare and are better handled by the third stage.

Condition (iii) recognizes the fact that when the path spans more than two contours, there is a likelihood that the path penetrates the body of one of the two individual characters, and that such paths are not allowed. If the individual characters do indeed touch at more than two places, splitting is deferred until the third stage.

Condition (iv) prevents the truncation of the extremities of wide characters. Certain characters such as the numeral "5" have "tails" that extend well beyond the body of the character, and these tails can cause the aspect ratio of the character to dip below the predetermined minimum acceptable value thereby resulting in mistaken advancement to the third stage. The truncated extremities rarely possess weights or heights comparable to those of the characters from which they came.

If any of the conditions (i), (ii), (iii), or (iv) are answered in the negative by the critic 70, the critic 70 sends the bitmap array of the connected characters on to the third stage.

Figure 8:
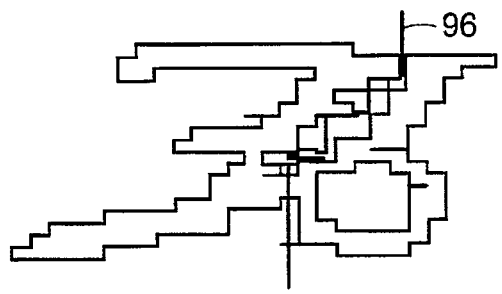
FIG. 8 shows a dividing line drawn between the connected character of FIG. 6B to separate the connected character into two individual characters.

In the third stage, the hit and deflect module 74 is used to incrementally build a dividing line 96 (FIG. 8) between the two individual characters. Whenever the dividing line encounters a contour, it "bounces off" the contour if possible, otherwise it "cuts through" the contour.

The hit and deflect module 74 uses two types of bitmaps, a "contoured" bitmap and a "solid" bitmap. The solid bitmap is the bitmap provided to the module 74 by the critic 70. The contoured bitmap is generated by the module 74 based on the solid bitmap. In the contoured bitmap, all pixels not on the contour or outline of the character are set to "0", i.e., the contoured bitmap contains a "hollow" character with an outline made of black or "1" pixels.

The module 74 begins drawing the dividing line at either the minimum point or the maximum point according to the following rules.

(1) In the solid bitmap, if the pixel is not bordered by any white pixels (i.e., "0" pixels), move the dividing line forward by one pixel;

(2) Else, in the contoured bitmap, if the pixel in front is white, move the dividing line forward by one pixel;

(3) Else, in the contoured bitmap, if the pixels to the left and right are white and the pixel in front is black, move the dividing line forward by one pixel;

(4) Else, in the contoured bitmap, if the pixel to the left is black and the pixel to the right is white, move the dividing line to the right by one pixel;

(5) Else, in the contoured bitmap, if the pixel to the right is black and the pixel to the left is white, move the dividing line to the left by one pixel;

(6) Else the current pixel is blocked to the left, right, and forward so move the dividing line forward by one pixel.

Note that rules (2), (4), and (5) perform deflection and forward movement in white space. Also, "forward" means upward movement if the dividing line is extending from the bottom up towards the top, or downward movement if the dividing line is being drawn from the top down towards the bottom. Rules (3) and (6) perform the initial piercing of the contour when no clear choice for the next move exists. Although no termination point is indicated above, it should be appreciated that the dividing line will no longer be drawn when it reaches an edge of the bitmap.

The hit and deflect module 74 passes its results to the segmentation critic 70 which checks for similar conditions described above with relation to the second stage. If any of those conditions fail, the critic 70 considers the bitmap to represent a single character (not a connected version of two individual characters), and the critic 70 therefore passes the bitmap on to the normalizer 54 (FIG. 3A) as representative of a single character.

Figure 9A:
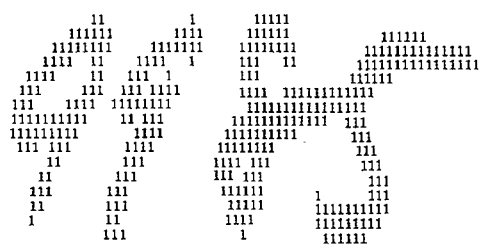
FIGS. 9A and 9B show a character string before segmentation (FIG. 9A) and the result (FIG. 9B) of passing the string through the segmentation portion of FIG. 5.
Figure 9B:
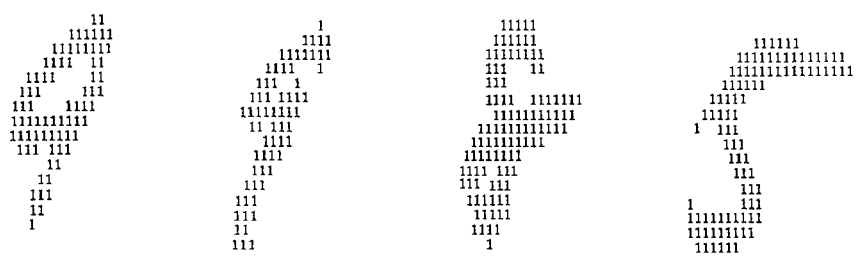
Figure 10A:
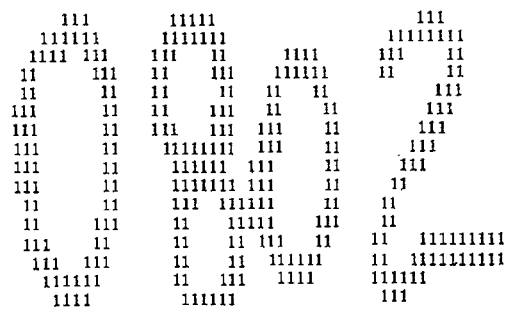
FIGS. 10A and 10B show a character string before segmentation (FIG. 10A) and the result (FIG. 10B) of passing the string through the segmentation portion of FIG. 5.
Figure 10B:
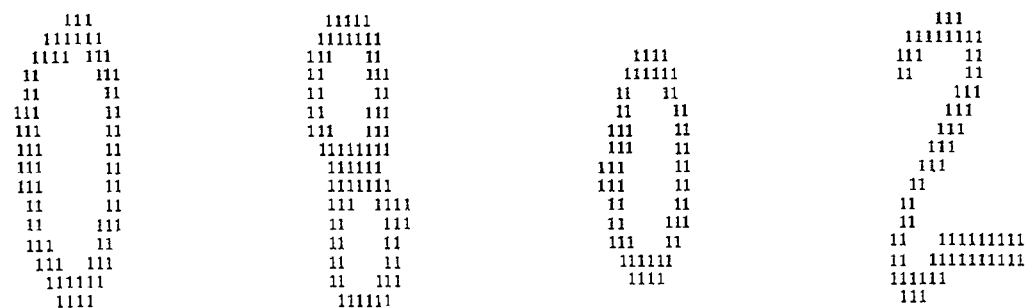

Two examples of character string segmentation are shown in FIGS. 9A and 9B (before and after segmentation), and FIGS. 10A and 10B (before and after segmentation).

After the segmenter 52 processes the bitmap array into a plurality of separate bitmap arrays, these separate bitmap arrays are fed to the normalizer 54 for further processing.

The three sub-modules 56, 58, and 60 (FIG. 3B) of the normalizer 54 (FIG. 3A) will now be described. Each of these sub-modules acts to reduce the variance in the data ultimately fed to the recognizer system 44. The variance can be very large due to the variety of handwriting styles and the variety of documents on which characters typically are handwritten. Both training and recognition efficiency of the recognizer 44 can be increased by reducing this variance. Each of the three sub-modules 56, 58, and 60 deals with a particular aspect of the variance problem.

Referring to FIG. 3B, the thinning and thickening module 62 reduces variations in the stroke thickness of each of the strokes which make up a particular character. Because any of a variety of writing implements (e.g. felt pens, ball-point pens, micro-tipped pens, and/or pencils) can be used to generate handwritten characters and character strings, a wide variety of thicknesses among characters of a string as well as among the strokes which form the individual characters can result. To get characters of a more uniform stroke thickness, the character is first "thinned" and then "rethickened" to attain a substantially uniform thickness among all characters.

Figure 11:
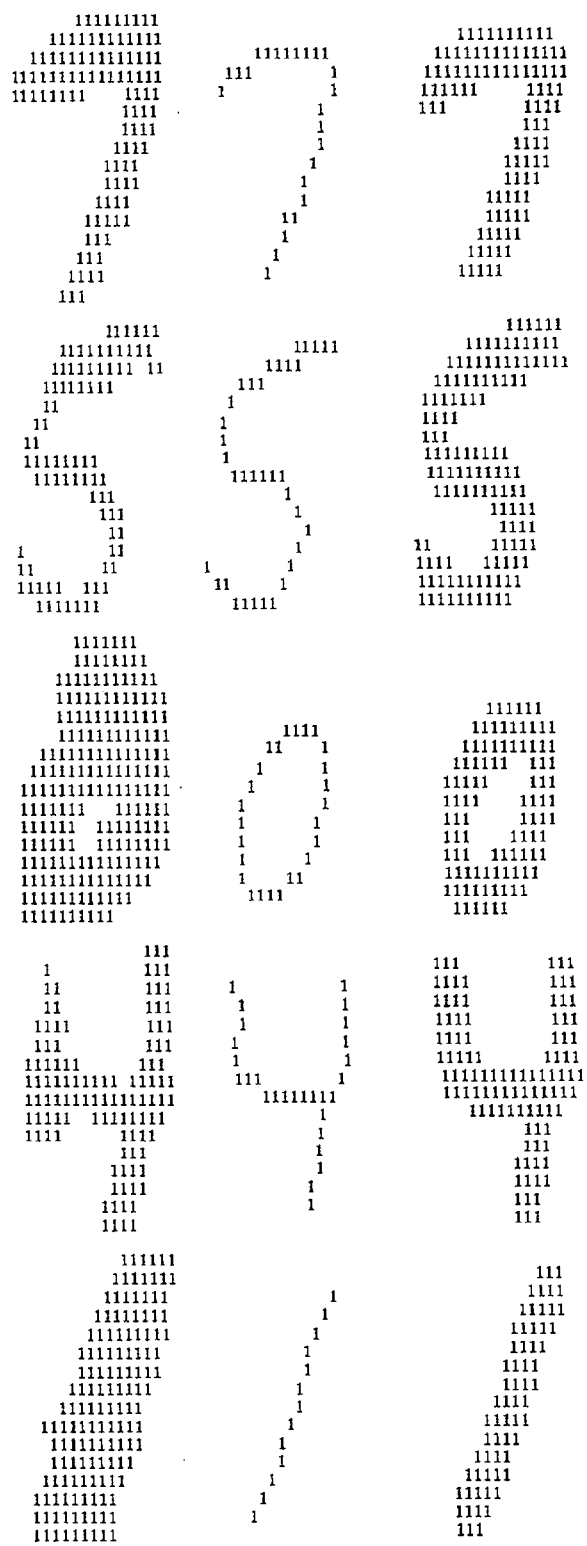
FIG. 11 shows five examples of a character (first column) which is thinned (second column) and then rethickened (third column) by a sub-module of the normalization portion of FIG. 3B.

In one embodiment, the thinning and thickening module 62 initially thins down the character to a one-pixel thickness to create a "skeletal" bitmap of the character. The skeletal bitmap is then processed to rethicken the character to a predetermined thickness which is typically greater than the one-pixel thickness of the skeletal bitmap and preferably three or four pixels wide. FIG. 11 shows several examples of a character of arbitrary thickness (first column) which is thinned to a single-pixel thickness (second column) by the thinning and thickening module 62 and then rethickened to a predetermined, substantially uniform thickness (third column) by the module 62.

Referring to Table 1, in one embodiment, the module 62 performs its thinning function by executing a computer program written in the "C" programming language. The computer program utilizes the following functions and stores the resulting "picture" in a matrix Q.

contour(p): tests whether a point is lying on a contour or not—it just looks for a white space in the neighborhood of the point delete (Q,p): deletes a point p in Q

TABLE 1

Thinning Process which can be Performed by a Processing Module in the Normalization Portion of FIG. 3B

```
Algorithm NWG:
g = 1;
repeat
    h = 0;
    Q=Q1; if (g==1) then g=0; else g=1;
    for each array element p of Q
        begin if contour(p) then
            case g of
                0:if 1<B(p)<7   and    (A(p)=1
                                        or c (p)=1)
                                and    ((p[2]+p[4])
                                        *p[0]*p[6])=0
                then begin
                    delete(Q1,p);h[k]=1;h=1;end
                1:if 1< B(p) <7 and    (A(p)=1
                                        or c(p)=1)
                                and    ((p[0]+p[6])
                                        *p[2]*p[4])=0
                then begin
                    delete(Q1,p);h[k]=1;h=1;end
            end case;
        end for;
until h = 0;
```

To aid in understanding the operation of the process of Table 1, it is helpful to note that the neighbors of a pixel p:(i,j) are identified by eight directions (i−1,j), (i−1,j+1), (i,j+1), (i+1,j+1), (i+1,j), (i+1,j−1), (i,j−1), and (i−1, j−1) where k=0, ..., 8 and p(8)=p(0), as shown in FIG. 12. Also, the contour points of a binary image pattern are those pixels for which at least one neighbor is white or "0".

Turning next to the size normalization module 64 of FIG. 3B, variations in the overall size of the characters are reduced by processing the bitmaps output by the segmenter 52 to proportionally adjust the size to a uniform, predetermined bitmap size. In general, recognizer module 44 only accepts a certain, predetermined size bitmap as an input.

In one embodiment, the module 64 accepts bitmap arrays of around 30×50 pixels and reduces them to a bitmap array of 16×16 pixels.

The module 64 can achieve size normalization by passing a window over the input bitmap and, based on the "1" or black pixels inside the window, the pixel corresponding to the present position of the window is either made a "1" or a "0". This operation preserves the structural features of the character while reducing the overall size of the bitmap. That is, this operation adjusts all of the input bitmaps such that the resulting bitmaps are the same overall size and contain characters which are all proportional to each other.

The slant correction module 66 of FIG. 3B performs another variance-reducing operation on the bitmaps received from the segmenter 52 before passing the bitmaps ultimately to the recognizer 44 which is tolerant to slight slant and/or rotation but generally intolerant to larger amounts of slant and/or rotation. In general, the module 66 reduces slant and/or rotation (hereinafter referred to only as slant) by re-orienting the character represented by the bitmap array received from the segmenter 52 to reduce, and preferably minimize, the overall width of the character.

In one embodiment, the module 66 receives 16×16 pixel bitmaps from the size normalization module 64 (FIG. 3B).

In general, the process performed by the slant correction module 66 corrects slant in characters by searching for a minimum width profile of a character using a binary search strategy on the angular slant of the character. The process is especially useful for handwritten Arabic numerals. Typically, with a numeral, when the overall width is reduced or minimized, the numeral is in a least-slanted position.

TABLE 2

Slant Correction Process which can be Performed by a Processing Module in the Normalization Portion of FIG. 3B

```
Algorithm Vertical
{
    gamma = 45
    while gamma > 0.5
    {
        w1 = WidthOfArray(input_bitmap);
        new_bitmap = TransformArrayByAngle(+gamma);
        (Slants the input_bitmap by angle +gamma)
        w2 = WidthOfArray(new_bitmap);
        new_bitmap = TransformArrayByAngle(-gamma);
        (Slant in the negative angle direction)
        w3 = WidthOfArray(new_bitmap);
        min_width = min (w1, w2, w3);
        if (min_width == w2)
            input_bitmap = TransformArrayByAngle(+gamma);
        elseif (min_width == w3)
            input_bitmap = TransformArrayByAngle(-gamma);
        (Otherwise leave the input as it is)
        gamma = gamma/2;
    }
    Printout(input);
}
```

Referring to Table 2, in one embodiment, the module 66 performs its slant correction function by executing a computer program 100. The process implemented by the computer program utilizes the function TransformArrayByAngle (X) which performs transformations given by $x'=x-(y*\tan(X))$, $y'=y$ which slants the input bitmap by X degrees from its present position. If a width versus slant-angle curve does not have a unique minimum point, the process avoids the problem of getting stuck at a local minima and never reaching the global minimum by perturbing the minimum state and then checking if the system again settles back to the same point. If a new point is reached, the system is again perturbed. After a series of perturbations and re-applications, the global minimum is reached. The disclosed process of slant correction uses binary search on the angle of slant as the criterion for stopping execution of the process. In general, the process is iterated until the slant becomes acceptably small, not absolutely zero.

FIGS. 13A, 13B, 13C, and 13D show two examples of bitmaps before and after slant correction by the module 66. FIG. 13A shows a 16×16 input bitmap of the numeral "7" and FIG. 13B shows the slant corrected version of the "7" as output by the module 66. FIG. 13C shows an input bitmap of the numeral "4" and FIG. 13D shows the slant corrected version of the "4".

Figures 14A, 14B, 15, 16A, 16B:
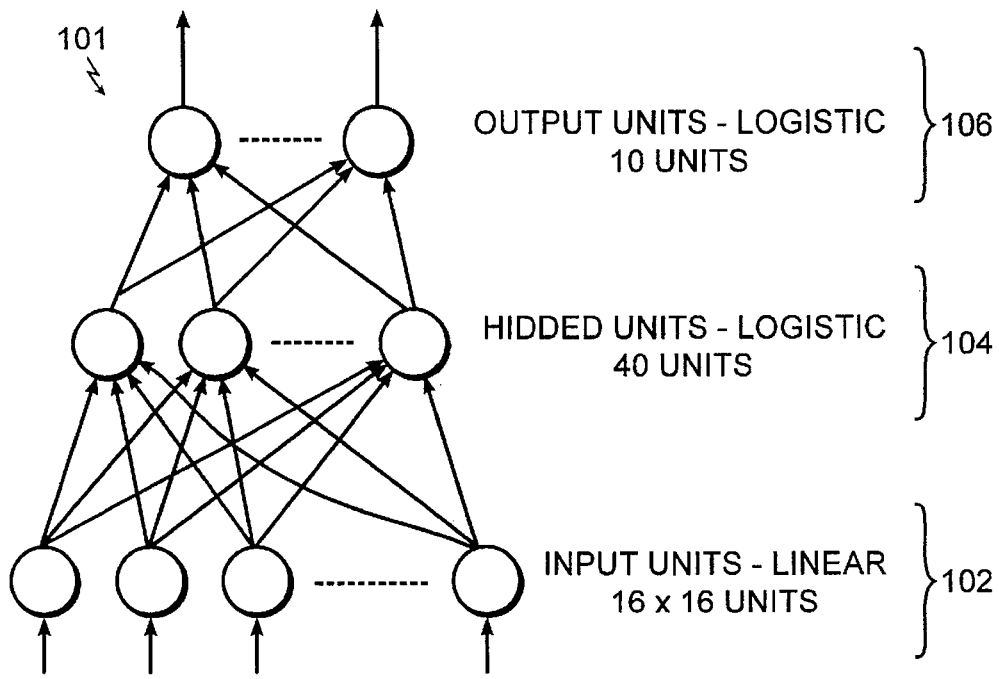
FIGS. 14A and 14B show another example of a character before slant correction and after slant correction.
FIG. 15 is one embodiment of a recognizer for use in the system of FIG. 3A.
FIGS. 16A and 16B show an input bitmap (FIG. 16A) to the system of FIG. 15 and the resulting output data (FIG. 16B) of the system of FIG. 15.

As mentioned previously, the slant correction module 66 is geared towards correcting numerical characters, especially handwritten numerals. The module 66 performs with better accuracy when processing a numeral, which typically has both a variable global slant and an internal slant, than when processing cursive words which typically have a uniform slant. (The handwritten number "3" provides an example of internal slant; it typically is globally unslanted but has an internal slant of about 45 degrees.) Thus, the process performed by the module 66 corrects both the internal slant of a number and the "global" slant (i.e., the overall, general direction in which the number leans). FIGS. 14A and 14B provide another example of a numeral before and after slant correction by the module 66.

Recognizer

The recognizer 44 according to the invention receives the output of the normalizer 54 of FIGS. 3A and 3B as its input. The recognizer module 44 processes images to generate a "best guess" as to the identity of the character represented by the input bitmap and produces an output bitmap of that best-guess character. The recognizer 44 can be neural network-based.

Referring to FIG. 15, in one embodiment, the recognizer 44 includes a fully-connected, three-layer neural network 101 which accepts 16×16 (i.e., 256-bit) bitmap arrays. The general structure of neural networks is well known to those of ordinary skill in the art. As indicated by FIG. 15, the disclosed embodiment of the neural network 101 includes an input layer 102, a hidden layer 104, and an output layer 106. The input layer 102 includes 16×16 linear units, which is 256 units, one for every pixel in an input bitmap. (Units are also known as "neurons".) The hidden layer 104 has forty logistic units whose activations vary from 0 to 1. The output layer 106 has ten logistic units whose activations also vary from 0 to 1. Each unit in the output layer 106 represents a different one of the ten possible Arabic numerals (i.e., 0, 1, 2, 3, 4, 5, 6, 7, 8, or 9). As a result of the recognition process, a bitmap of the numeral corresponding to the output unit with the highest activation is produced as the output bitmap by the neural network-based recognizer 44.

In the disclosed embodiment, the output bitmap of the neural network-based recognizer 44 represents one of the ten possible Arabic numerals. That is, the output bitmap is selected from a fixed, predetermined set of bitmaps which, in the disclosed embodiment, is ten bitmap arrays representative of the ten Arabic numerals. The set of output bitmaps can be "standard" bitmaps which are stored (e.g., in ROM or RAM of a computer, or some type of data storage device accessible by a computer) and retrieved by the recognizer 44 as indicated by the output layer 106 of the neural network 101. The output bitmaps are standard in that the recognizer 44 will produce the same output bitmap for every input bitmap determined to represent a particular one of the ten possible characters.

In the disclosed embodiment of the neural network 101, a back-propagation process is used to "train" the neural network 101. This type of training process is known to those of ordinary skill in the art. Other training processes are possible.

Neural networks can be used for recognizing characters (e.g., typewritten and/or handwritten characters), and generally for recognizing patterns, in part because they can be "taught" what a particular character will tend to look like. In one respect, a neural network can be thought of as making "predictions" based on its training and the current input.

In the disclosed embodiment, activations (or "confidence values") are associated with each of the ten output units of the output layer 106. These confidence values essentially are a measure of the neural network's confidence that a particular input bitmap represents a particular character. The character corresponding to the output unit with the highest confidence value is selected as the "correct" character. If this character selection turns out to be incorrect, another output unit is selected (e.g., the unit with the next highest confidence value).

The forty units of the hidden layer 104 act as feature detectors in a backpropagation network. This means that each unit turns on "hard" when it detects a certain feature in the input bitmap. In this fully-connected neural network, each of the hidden units is connected to each of the input units of the input layer 102. Thus, the connections to the hidden units form 16×16 matrices where the elements of each of the matrices are the weight values or the interconnection "strengths". These weights values can be inhibitory (negative) or excitory (positive). the strongly positive elements in a "feature matrix" provide an indication as to which feature a particular hidden node has been trained to detect.

The units in the output layer 106 use the results of the feature detectors to reach a decision. Each unit in the output layer emphasizes each feature detector according to the weight of the interconnections. For example, if a feature detector, or hidden unit, has been trained to detect the loops in the numeral "8", the connection between that feature detector and the output unit designated for "8" will be a particularly strong one so as to force the output unit's activation value as close to one as possible.

Referring to FIGS. 16A and 16B, a bitmap of the numeral "7" (FIG. 16A) which was fed as input to the neural network 101 produced the output shown in FIG. 16B. As seen in FIG. 16B, the seventh output unit had the highest confidence value, a value of about 0.96, and so the neural network 101 output the correct character in response to the bitmap input of FIG. 16A. If "7" was discovered to be the wrong character (e.g., by a post processing procedure described below), the fifth output unit might be selected because its confidence value is the next highest of the other nine output units.

In one embodiment, as indicated in FIG. 3A, the output of the neural network-based recognizer 44 is returned to the input 46 of the pre-processor 42 for additional processing by the system 16 if the recognizer 44 deems its output bitmap to be unacceptable (e.g., if the highest activation value of the output units is below some predetermined threshold).

Post-processor

In some instances, the recognizer 44 (FIG. 3A) selects the wrong character (e.g., an "8" is mistaken for a "9"). The post-processor 48 is designed to supplement the recognition process to improve the accuracy of the process.

In general, the post-processor 48 examines the bitmap generated by the recognizer 44 and makes a determination as to the validity of the selection made by the recognizer 44. In one embodiment, gross structural features such as character strokes and contours contained in the bitmap fed to the post-processor 48 by the recognizer 44 are used for this purpose. As an option, if the post-processor 48 deems its output bitmap to be unacceptable, it can return the output bitmap to the input 46 of the pre-processor 42 for additional processing by the system 16.

The post-processor 48 can use various techniques to distinguish one character from another. For example, the geometry and/or topology of an image (e.g., bitmap) can be used to distinguish characters represented by the image. Geometric and/or topological features include (i) loops such as appear in the handwritten numerals 0, 6, 8, and 9, (ii) straight lines which appear in such handwritten numerals as 1, 4, 7, and 9, (iii) endpoints, and (iv) intersections.

Another technique is "zoning" which uses a statistical distribution of pixels. In zoning, a bitmap array is divided into zones and the density of pixels in each zone is examined to determine the best character of two candidates. Zoning is not a complex process. It can be performed very quickly, and it can give very high accuracies. In general, histograms are generated for each of the possible output characters. In one embodiment, each histogram is a 16×16 matrix representing the sum of one thousand 16×16 bitmaps for a particular character. These histograms are useful for determining where a particular character is likely, and not likely, to have ones, i.e., the histograms indicate the "density" of ones and zeroes. A strategy for using zoning is to concentrate on the areas where the two characters are most geometrically different from one another. For example, if the two characters are "5" and "6", the area of interest for distinguishing between these two handwritten characters can be the lower, left-hand corner of the bitmaps of these characters, as any legibile six should have a completed loop in that corner. If the possible characters are the ten numerals, a system of forty-five zoning modules can be used to distinguish between the possible two-character combinations.

In one embodiment, the post-processor 48 performs various processes to distinguish between pairs such as 8 and 9, 3 and 5, 2 and 6, 3 and 8, 5 and 8, 5 and 9, 5 and 6, 4 and 9, 7 and 9, and 1 and 6. These character pairs can be confused by the recognizer 44 of FIG. 3A. In general, many of the mistakes made by the recognizer 44 can be attributed to several troublesome character pairs, and among those several character pairs, the most troublesome generally is "8" and "9".

To distinguish between eights and nines, the focus should be on the bottom portion of the bitmap because handwritten eights and nines are least similar in the bottom half of the bitmap. A module for distinguishing between eight and nine can use the existence of a loop in the bottom half of the bitmap to decide whether it represents an eight or a nine. This concentration on a specific "window" in the bitmap is similar to the zoning technique previously described. In one embodiment, this module looks for a "loop" feature in the bottom zone of the bitmap. The bottom six rows are examined in the disclosed embodiment. Using this module, eights and nines can be distinguished effectively, simply, and quickly. The same process can be used to distinguish between a one and a six.

To distinguish between threes and fives, structural differences can be used. The zone of interest in this instance should be the upper portion of the bitmap because handwritten threes and fives are geometrically similar in the lower half of their bitmaps. In one embodiment, this module examines the average column position of "one" bits in rows four through eight of the bitmap, and if this average column position is sufficiently to the right of the bitmap, the character is determined to be a three instead of a five.

To distinguish between twos and sixes, histograms can be used to determine regions where these numerals are least likely to have "one" bits or pixels. Zoning techniques can be used by this module to examine the density of "one" pixels in particular zones.

To distinguish between threes and eights and between fives and eights, the left-hand portion of the bitmap can be used as the zone of interest because most eights have closed loops on this side whereas threes and fives do not.

To distinguish between fives and nines, the geometrical feature of interest can be a loop in the upper right-hand portion of the bitmap.

To distinguish between fives and sixes, the area of interest is the lower left-hand quarter of the bitmap because most handwritten fives will have loops which open up in this region, whereas sixes will tend to have closed loops in this area. Similar processing can be used to distinguish between threes and nines and between threes and sixes.

To distinguish between fours and nines, the area of interest should be the top half of the bitmap.

To distinguish between sevens and nines, the process involves examining the position of the first "one" bits along three diagonals. Starting in the first column, each of the three diagonals is examined until a "one" bit is encountered. By summing the column positions of the first "one" bits along these three diagonals, a reliable technique for distinguishing between handwritten sevens and nines is achieved.

In general, by concentrating on geometrical and/or topological differences between a pair of characters, relatively straightforward and efficient post-processing procedures can be implemented to enhance the accuracy of the recognition system. Additional processes can be performed by the post-processor 48 to handle more or all of the possible character combinations, as will be appreciated by those of ordinary skill in the art.

In using the system 16 (FIG. 3A) without the post-processor 48 attached, a rejection threshold can be set in the neural network-based recognizer 44. Values that the rejection value can be set at include 0.8 and zero (i.e., no rejection). In general, the rejection value effects the performance of the neural network-based recognizer 44 because if the highest activation value among the output units does not exceed the rejection value, the recognizer 44 rejects the input bitmap and, in one embodiment, informs the user that a prediction regarding that input bitmap was not reached.

In one embodiment, the system described herein is implemented with dedicated electronic hardware. In another embodiment, the system is implemented using a computer, such as a commercially available personal computer, executing appropriate computer instructions.

Note that while the system described herein is directed at recognizing handwritten Arabic numerals (generally non-cursive), it can be used to recognize various characters such as typewritten characters, handwritten characters (cursive or non-cursive), and/or various symbols from one or more languages in addition to (or instead of) the English language.

Other modifications and implementations will occur to those skilled in the art without departing from the spirit and the scope of the invention as claimed. Accordingly, the invention is to be defined not by the preceding illustrative description, but by the following claims.

What is claimed is:

1. A neural network-based character recognition system, comprising:

a receiver for receiving a first binary image of a plurality of characters;

a segmenter for separating the first binary image into a plurality of second binary images corresponding to the plurality of characters in the first binary image;

a normalizer for reducing variations among the plurality of characters by processing the second binary images, comprising:

a stroke adjuser for processing the second binary images to adjust strokes of the characters first to a one-pixel thickness and then to adjust the one-pixel thickness strokes to a second thickness which is substantially uniform and which is greater than the one-pixel thickness, a size normalizer for processing the second binary images to proportionally adjust the overall size of the characters to a predetermined overall size, and a slant correcter for processing the second binary images to reduce a slant with respect to a predetermined axis of the characters by using a binary search strategy which converges within a predetermined error margin; and a neural network recognizer coupled to the normalizer for processing the stroke-adjusted, size-normalized, and slant corrected second binary images to determine which character is represented by each of the second binary images processed by the normalizer.

2. The character recognition system of claim 1 further comprising a scanner for scanning a document having the plurality of characters thereon to create the first binary image.

3. The character recognition system of claim 2 wherein the document comprises a financial document.

4. The character recognition system of claim 3 wherein the financial document comprises a check.

5. The character recognition system of claim 1 wherein the plurality of characters comprises generally non-cursive, handwritten characters.

6. The character recognition system of claim 5 wherein the plurality of characters includes Arabic numerals.

7. The character recognition system of claim 1 wherein the neural network identifies one character from a predetermined set of characters for each of the second binary images processed by the normalizer.

8. The character recognition system of claim 7 wherein the neural network generates a confidence value for each of the characters identified from the predetermined set of characters to indicate a measure of the accuracy of the identification made by the neural network.

9. The character recognition system of claim 8 wherein the confidence value ranges from zero to one, a value of zero indicative of the worst possible accuracy of the identification and a value of one indicative of the best possible accuracy.

10. The character recognition system of claim 1 wherein the segmenter comprises a plurality of stages.

11. A method of processing a binary image of a character and then providing the processed binary image to a neural network character recognizer for recognition by the neural network character recognizer as one of a predetermined set of characters, comprising the steps of:

providing the binary image of the character which includes one or more strokes forming the character, each stroke having a length and a thickness which can vary over the length;

processing the binary image to adjust each of the strokes of the character to a one-pixel thickness;

processing the adjusted binary image to adjust each of the adjusted one-pixel thickness strokes of the character to a second thickness which is substantially uniform and which is greater than the one-pixel thickness; and providing the twice-adjusted binary image to the neural network character recognizer for recognition as one of the predetermined set of characters.

* * * * *